United States Patent [19]
Tran

[11] Patent Number: 5,808,506
[45] Date of Patent: Sep. 15, 1998

[54] MOS CHARGE PUMP GENERATION AND REGULATION METHOD AND APPARATUS

[75] Inventor: Hieu Van Tran, San Jose, Calif.

[73] Assignee: Information Storage Devices, Inc., San Jose, Calif.

[21] Appl. No.: 724,186

[22] Filed: Oct. 1, 1996

[51] Int. Cl.$^6$ ........................................................ G05F 1/10
[52] U.S. Cl. ......................... 327/537; 327/541; 327/546; 323/315; 323/317
[58] Field of Search .......................... 327/530, 534–538, 327/540, 541, 543, 545, 546; 323/312, 315, 317

[56] References Cited

U.S. PATENT DOCUMENTS

| | | | |
|---|---|---|---|
| 4,890,259 | 12/1989 | Simko | 365/185.03 |
| 4,989,179 | 1/1991 | Simko | 365/185.03 |
| 5,126,967 | 6/1992 | Simko | 365/45 |
| 5,164,915 | 11/1992 | Blyth | 360/69 |
| 5,220,531 | 6/1993 | Blyth et al. | 365/185.03 |
| 5,241,494 | 8/1993 | Blyth et al. | 365/185.03 |
| 5,243,239 | 9/1993 | Khan et al. | 327/553 |
| 5,294,819 | 3/1994 | Simko | 365/185.03 |
| 5,352,934 | 10/1994 | Khan | 327/538 |
| 5,388,064 | 2/1995 | Khan | 365/45 |

OTHER PUBLICATIONS

"Physics and Technology of Semiconductor Devices", A.S. Grove, pp. 311–314, John Wiley and Sons, Inc. (1967).

"On–Chip High–Voltage Generation in MNOS Integrated Circuits Using an Improved Voltage Multiplier Technique", J.F. Dickson, IEEE Journal of Solid–State Circuits, vol. SC–11, No. 3, Jun. 1976.

*Primary Examiner*—Kenneth B. Wells
*Attorney, Agent, or Firm*—Blakely, Sokoloff, Taylor & Zafman LLP

[57] ABSTRACT

MOS charge pump generation and regulation method and apparatus of the general type used in a non-volatile memory chip for generating high voltages (~20 v). This invention utilizes a current controlled oscillator to generate the clock for the charge pump voltage multiplier. The oscillator frequency is designed to compensate for process, temperature and power supply variations. The charge pump shunt regulator only utilizes regular low voltage NMOS and PMOS from a standard CMOS process. A reference voltage scheme is used in which a regular low voltage PMOS is used as a mirror diode (reference PMOS) to precisely realize a control voltage for the shunting NMOS without violating any breakdown mechanism, i.e. PMOS gated diode breakdown and P+ to n-well junction breakdown. A medium voltage level is also used to buffer the shunting NMOS transistors from gated diode breakdown. A native NMOS cascode current mirror is used to precisely mirror the current to achieve minimum headroom voltage with minimum circuit area.

23 Claims, 4 Drawing Sheets

MOS CHARGE PUMP GENERATION AND REGULATION METHOD AND APPARATUS

BACKGROUND OF THE INVENTION

1. Field of the Invention

The present invention relates to the field of CMOS integrated circuit design, and more specifically to non-volatile memory integrated circuits which include on-chip circuitry for generating high voltages.

2. Prior Art

Non-volatile memory integrated circuits normally require a high voltage, higher than the normal power supply voltage, for memory cell programming and erasing such as by Fowler-Nordheim tunneling or channel hot electron injection. The high voltage is normally generated on-chip using a voltage multiplier, also known as a charge pump.

The prior art implements the charge pump using the principles described in the article entitled "On-chip high-voltage generation in NMOS integrated circuits using an improved voltage multiplier technique" by J. F. Dickson, IEEE J. Solid State Circuits, vol. SC-11, June 1976, pp. 374–378. The clock driver normally is driven from a ring oscillator (odd number of inverters tied in a ring configuration), or from a constant frequency oscillator.

The multiplied output voltage is a function of the number of NMOS/capacitor stages, the threshold voltages of all the NMOS transistors, the clock voltage swing, and the clock frequency. The charge is transferred from one stage to the next stage by voltage coupling through the capacitors. With the clock voltage swing equal to VCC, which is typically the case, the open circuit output voltage is VO≈(N+1)(VCC−VT), where VT is the average threshold voltage of the diode connected NMOS devices with the body effect, and N is the number of stages (each stage consists of a diode connected MOS device and a pumping capacitor).

The short circuit output current IS≈(C)(VCC)(F), where C is the capacitance of the pumping capacitor for each stage and F is the frequency of operation of the charge pump. The pump output voltage versus current is V=(−VO/IS)(I)+VO. This is a linear relationship with slope $$\left(\frac{\partial V}{\partial I}\right)$$

equal to −VO/IS. The operating point is normally fixed for a certain technology with a certain capacitance load. For example, for a typical non-volatile memory requirement, V≈20 V and the current required to charge a capacitance load of 100 pf in a time of 100 µs is I=CV/t=100 pf*20 V/100 µs=20 µa.

From the above equations, the following effects can be observed:

1. As VT is higher, such as at a slow process corner or at low temperature, VO is lower. Hence V is lower for a given current.
2. As VCC is lower, VO is lower, and IS is also lower. Hence V is lower for a given current.

Thus this circuit is very inefficient at the slow process corner (VT is larger), at low temperatures (VT is larger), or at low power supply voltages (VCC is lower).

The charge pump is normally regulated to avoid the over-voltage stress on the various devices which could cause reliability problems. The prior art using high voltage shunt regulation typically employs diode connected MOS devices (MOS devices each having its gate connected to its drain) to realize the voltage reference. In this prior art, these diode connected MOS devices are strung in a diode chain to realize multiple threshold voltages VTs (the gate to source voltage of each device is realized as a VT) as the control voltage for the shunting NMOS devices.

The MOS diodes conduct when the high voltage is pumped high enough. The high voltage will turn on the shunting NMOS devices to clamp the high voltage to a constant voltage as long as the high voltage sourcing current of the charge pump is limited compared to the sinking current capability of the shunting NMOS devices.

Such a control reference voltage varies with process, temperature and body effect variations because of the threshold voltage variation of the MOS devices, which is not desirable for precise regulation. The shunting NMOS device also requires a high gated diode breakdown voltage since its gate is either at ground potential (in the disable state or starting condition) or a VT above VSS (when it is shunting) Thus the gate to drain voltage is, at the worst case, the same as the high voltage, e.g. 21 V. The gated diode breakdown is the zener junction diode breakdown between the drain and the substrate with the gate assisting. Once the NMOS device breaks down, it will clamp the high voltage at the breakdown voltage instead of at the supposedly regulated voltage. For a typical CMOS process, the gated diode breakdown for a low voltage NMOS device is about 13 V and for a high voltage NMOS device is about 23 V. A high voltage NMOS is for example an NMOS device with double diffused junctions on source and drain to smooth out the electrical field curvatures at those junctions. (A description of the gated diode breakdown can be found in the textbook entitled "Physics and Technology of Semiconductor Devices", Wiley, N.Y., 1967, pp. 311–314 by Andy Grove.)

Other implementations could also use zener diodes as a voltage reference to generate the control voltage for the shunt NMOS devices. As soon as the zener diode conducts, meaning the high voltage source is providing enough current for the current bias, the shunting NMOS devices are turned on to clamp the high voltage. However such a zener is not readily available in a standard CMOS process. Some other regulators sometimes use the gated diode breakdown of MOS devices or junction breakdown to regulate the high voltage. In such cases, some complications can occur, such as the high voltage supply has to have a higher voltage output than the breakdown voltage, the breakdown voltage has to be monitored so that it does not cause permanent damage to the junctions or gate oxide, the breakdown voltage could vary with temperature and process variations, etc.

BRIEF SUMMARY OF THE INVENTION

The present invention voltage multiplier utilizes a current controlled oscillator to generate a clock with a frequency compensated for process corner, temperature, and power supply variations. As the process corner gets slower (VT is larger), clock frequency increases, as the temperature gets colder (VT is larger), clock frequency increases, and as the power supply voltage gets smaller, clock frequency increases. The higher frequency makes the short circuit current higher. Thus the charge pump operation is improved by modulating the current versus the process, temperature, and power supply variations.

This invention high voltage shunt regulator only utilizes regular low voltage NMOS and PMOS devices from a standard CMOS process by using a special scheme for generating the control voltage for the shunting NMOS devices as follows. A regular low voltage PMOS device is used as a mirrored diode PMOS device (having gate, drain, and n-well connected together) to generate the control voltage to turn on the shunting NMOS transistors. A VGS (gate to source voltage) reference of a PMOS device is mirrored precisely to a chain of diode connected PMOS transistors to realize such a precise voltage. The VGS reference is generated by imposing a reference voltage on the source of a reference PMOS device and another reference voltage on the gate of the same reference PMOS device. These references can be generated by a standard CMOS bandgap circuit. The mirrored PMOS transistors have their own substrates tied to their own sources to eliminate the body effect in order to achieve the precise VGS mirroring. The VGS reference creates a bias current in the reference PMOS device, which is mirrored by a native NMOS cascode current mirror to the diode connected PMOS transistors. The variations in the bias current due to process variations and threshold and mobility variations over temperature do not matter since the same amount of current is flowing through the diode connected PMOS transistors as the reference PMOS device, which recreates the same VGS reference for each diode connected PMOS devices.

Thus a multiple of precise VGS references is created along the diode chain, which provides a stable control voltage for the shunting NMOS transistors. Since across any diode connected PMOS device, the drain to gate voltage is precisely at the VGS voltage reference, and the P+ drain to n-well is also at the VGS voltage reference, no breakdown mechanism is violated.

The top shunting NMOS device utilizes a medium voltage level, about 11 V, on its gate to avoid the gated diode effect of the NMOS device since its gate to drain voltage is at a voltage of VHV−MHV, e.g. 21−11=10 V, which is much less than the normal gated diode breakdown device specification of a low voltage NMOS device. The bottom shunting NMOS device also sees a maximum gate to drain voltage of MHV−VT≈10 V. Thus regular low voltage NMOS transistors are used for the shunting NMOS transistors.

The current mirror utilizes a cascode configuration with native NMOS devices (threshold voltage VT≈0 V) to achieve precise current mirroring with minimum headroom voltage and minimum circuit area. The normal NMOS cascode current mirror uses two NMOS transistors diode connected in series, which requires a headroom voltage of 2 VGS=2 VT+2 ΔVs (the 2 ΔVs are needed for the bias current). The native NMOS cascode current mirror as used in the present invention only requires 1 VGS=1 VT+1 ΔVs. Other cascode NMOS circuits which have a similar minimum headroom voltage require much more complicated circuits.

DETAILED DESCRIPTION OF THE INVENTION

Figure 1A:
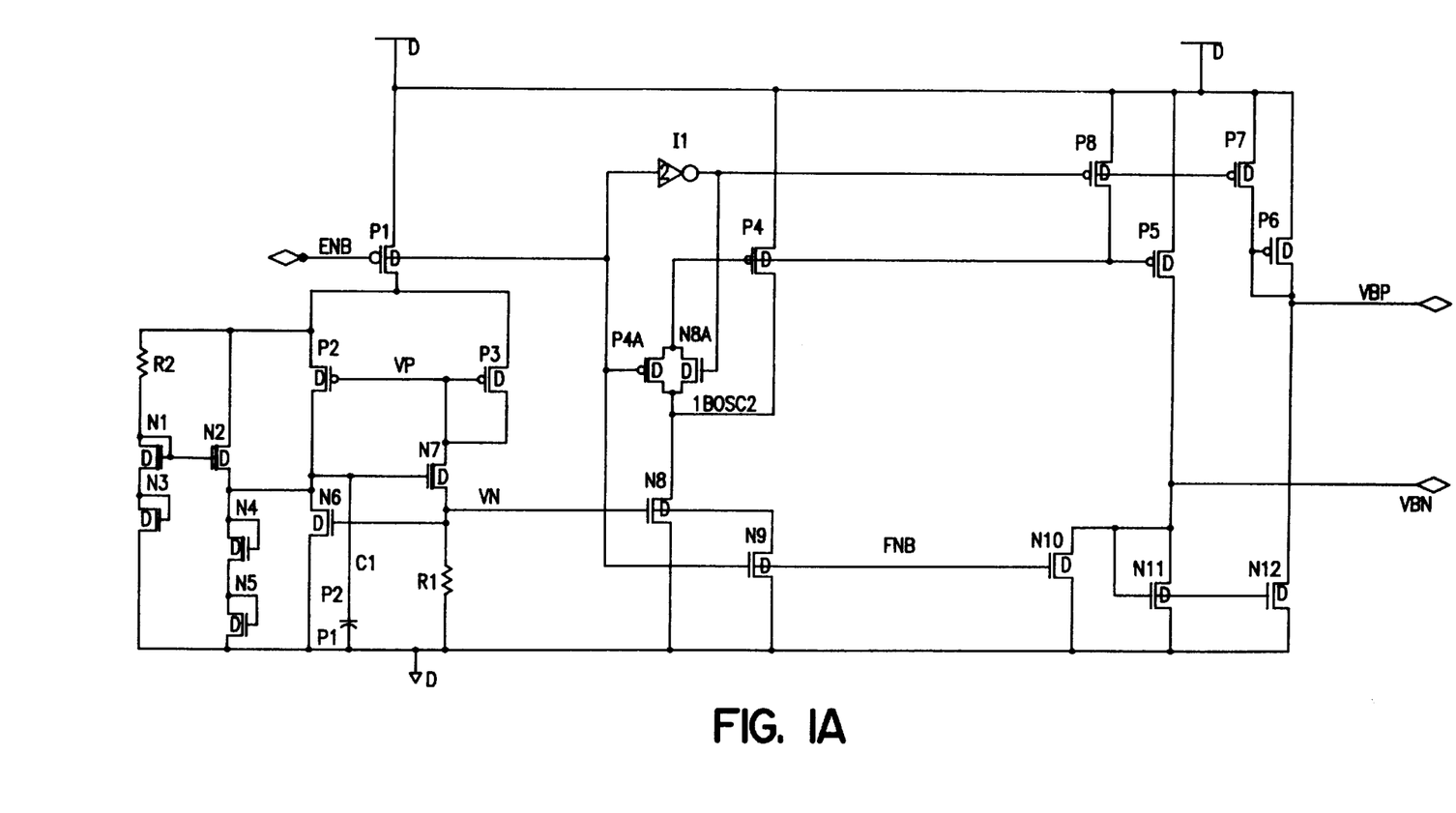
FIG. 1a is a circuit diagram for the bias generator used in the preferred embodiment of the present invention.
Figure 1B:
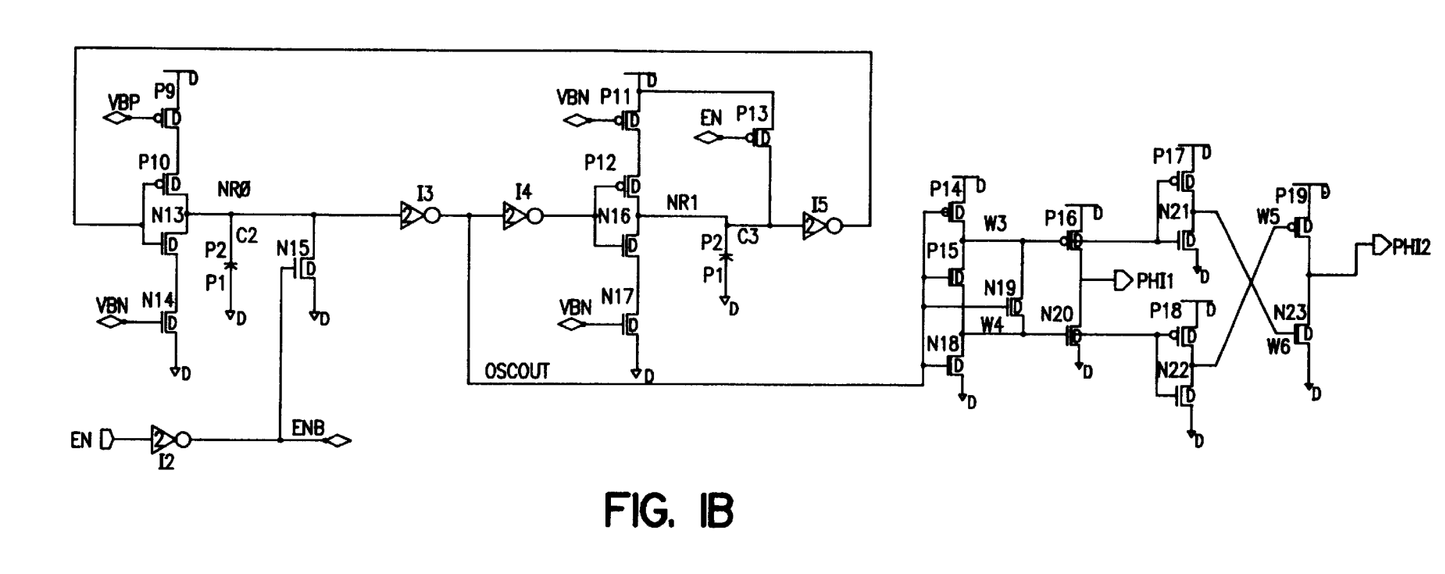
FIG. 1b is a circuit diagram for the oscillator and phase driver circuits of the preferred embodiment of the present invention.

First referring to FIG. 1a, a circuit diagram for the bias generator for the oscillator of FIG. 1b may be seen. The circuit shown is controlled by a negative logic enable signal ENB. When the circuit is disabled, the signal ENB will be high, turning off devices P1 and P4A and turning on devices N9 and N10, in turn turning off devices N11 and N12. Also, the high state of the signal ENB as inverted by inverter I1 turns off device N8A and turns on devices P8 and P7, which turn off devices P5 and P6, respectively. With device P5 off and device N10 on, the output VBN is pulled low, and with device P7 on and device N12 off, the output VBP is pulled high.

When the circuit is enabled, the signal ENB will go low, turning on devices PI and P4A, and turning on device N8A through inverter I1. At the same time, devices N9 and N10 will be turned off, and through inverter I1, devices P7 and P8 will also be turned off.

With the circuit enabled, current will flow through diode connected device P3 and device N7 and through resistor R1 to the circuit ground. The current through device P3 is also mirrored to device P2 to flow through device N6 to ground, the device N6 having its gate connected to the source of device N7. In this manner, the voltage VN across resistor R1, a temperature insensitive metal film resistor, is approximately equal to the threshold voltage VT of device N6, the device N6 conducting a current equal to (or alternatively proportional to) the current through resistor R1. If the voltage VN increases above this value, then the device N6 will be turned on harder, pulling the gate of device N7 lower to reduce the current through resistor R1 and thus reduce the voltage VN. Similarly, the circuit automatically compensates in the event that the voltage VN is lower than approximately the threshold of device N6, capacitor C1 providing stability for the operation of the circuit. Thus, VN approximately equals the threshold voltage of device N6 having a substantially power supply voltage independent current there through.

Diode connected devices N1, N3, N4 and N5, and device N2 and resistor R2 at the left of FIG. 1a assure a proper start-up of the circuit by raising the node consisting of the drains of devices P2 and N6 and the gate of device N7 to a sufficient level to assure that devices P2, P3, N6 and N7 are initially urged on, from which they can find their stable operating point. This current I≈VT/R1 of device N6 is mirrored to device N8. The current through N8 also flows through device P4 and is mirrored thereby to device P5, which also flows through device N11, setting the output voltage VBN substantially equal to the n-channel threshold voltage VT of device N6. Further, the current through device N11 is mirrored to device N12, and thus forms the current through device P6. Consequently, the output voltage VBP of the bias generator is substantially equal to one p-channel threshold voltage below VCC, the threshold voltage representing the threshold for a current through device P6 as measured by the substantially power supply voltage independent current there through. The basic bias section comprising devices N1–N7, P1–P3, R1, R2 and C1 is separated from the final bias section comprising P5, P6, N11 and N12 so that it can be operated at a lower current for the minimum VCC required for that section.

The oscillator and phase driver circuits are shown in FIG. 1b. When the oscillator is disabled, the signal EN will be low, and the signal ENB through the inverter I2 will be high. This turns on device N15 to clamp the voltage on capacitor C2 low and turns on device P13 to clamp the voltage on capacitor C3 high. Also as stated before, VBN will be low and VBP will be high, turning off devices N14, N17, P9 and P11 to disable the inverters formed by devices P9, P10, N13 and N14, and P11 and P12, N16 and N17.

When the circuit is enabled, devices N15 and P13 will both turn off. Now the oscillator circuit is comprised of five inverters in a ring, the two inverters formed by devices P9, P10, N13 and N14, and P11 and P12, N16 and N17, and the three inverters I3, I4 and I5. The period of the oscillation is controlled by the current charging and discharging capacitors C2 and C3. The charge currents are the currents mirrored from device P6 of the bias generator of FIG. 1a by VBP into devices P9 and P11, and the discharge currents are the currents mirrored from device N11 of the bias generator of FIG. 1a by VBN into devices N14 and N17.

Inverters I3 and I4 provide a sharp control signal for devices P11, P12, N16 and N17, and similarly, inverter I5 provides a sharp control signal for devices for P9, P10, N13, N14. This is to open and close the inverter switches completely so as to not affect the timing, as devices P10, N13 and P12, N16 act as switches for the bias current charging and discharging the capacitances C2 and C3, respectively, as just described.

Referring again to FIG. 1b, the clock (phase) driver includes devices P14 through P19 and devices N18 through N23. When the oscillator output OSCOUT is low, devices P14 and P15 will be on and devices N18 and N19 will be off. This turns on devices N20, N21 and N22 and turns off devices P16, P17 and P18, which in turn, turns on device P19 and turns off device N23 to pull the signal PH2 high. On the other hand, when the signal OSCOUT is high, devices P14 and P15 will be turned off and devices N18 and N19 will be turned on, turning off device N20 and turning on device P16 to pull the signal PH1 high. Also, devices N21 and N22 will be off and devices P17 and P18 will be on, turning off device P19 and turning on device N25 to pull the signal PH2 low. Devices P15 and P19 are to introduce a delay into the signals W3 and W4 to generate non-overlapping signals for devices P16 and N20. This is to minimize the crowbar current flowing in devices P16 and N20. Similarly, devices P17 and N21, and P18 and N22, provide the other non-overlapping control signals for devices P19 and N23.

Figure 1C:
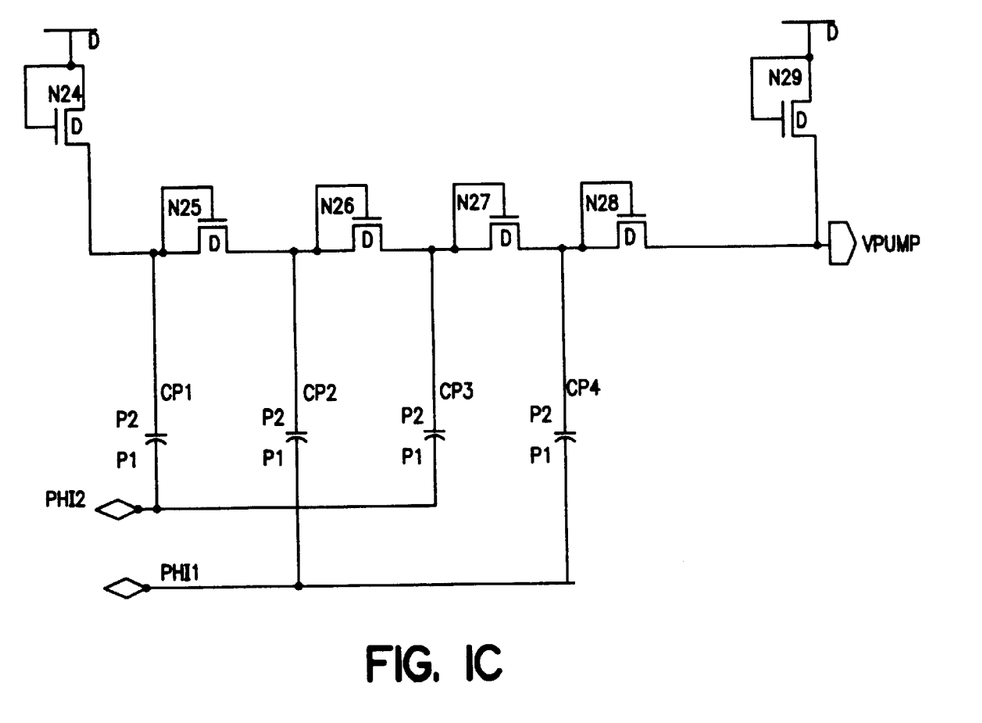
FIG. 1c is a circuit diagram for the voltage multiplier circuit of the preferred embodiment of the present invention.

Now referring to FIG. 1c, the voltage multiplier circuit may be seen. In the specific embodiment shown, four stages are illustrated for exemplary purposes, though a fewer or greater number of stages may readily be used as desired. The operation of such circuits is well known in the art and need not be described in any great detail herein. In general, diode connected device N29 precharges the output of the charge pump to VCC−VT. When PHI2 is low, capacitor CP1 charges to VCC−VT through diode connected device N24. When PHI2 goes high and PHI1 goes low, diode connected device N24 becomes back biased and diode connected device N25 becomes forward biased, transferring charge from capacitor CP1 to capacitor CP2. Similarly, when PHI2 goes low and PHI1 goes high again, capacitor CP1 is recharged through diode connected device N24, while the increase in voltage on the source of diode connected device N25 and the gate and drain of device N26 back biases diode connected device N25 and forward biases diode connected device N26, transferring charge from capacitor CP2 to capacitor CP3. Thus, charge is successively pumped form capacitor CP1 through the series of capacitors to the output VPUMP, the amount of charge being pumped to the output depending upon the output voltage, varying linearly from a zero current output at a maximum (open circuit) output voltage to a maximum current at zero (short circuit) output voltage.

Figure 2:
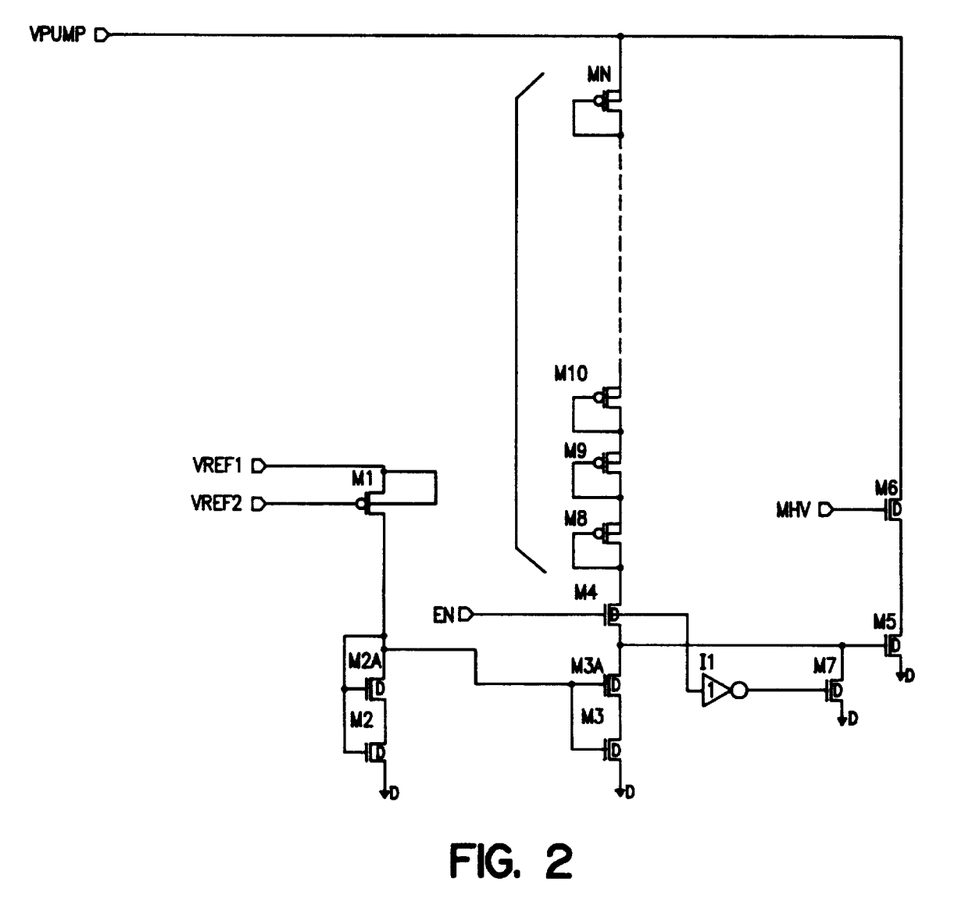
FIG. 2 is a circuit diagram for the high voltage shunt regulator of the preferred embodiment of the present invention.

Now referring to FIG. 2, the high voltage shunt regulator used with the present invention may be seen. The device M6 has its gate connected to a medium-high voltage MHV, approximately 11 volts, to buffer the device against gated diode breakdown due to the high voltage VPUMP as regulated by the high voltage shunt regulator, typically to approximately 20 volts. When the circuit is disabled, the signal EN will be low, turning off device M4 and, through inverter I1, to turn on device M7, turning off device M5. When the circuit is enabled, the signal EN will be high, turning on device M4 and turning off device M7. As the voltage VPUMP increases to the regulated voltage, the chain of diode connected P-channel devices M8 through MN will begin to conduct. When they conduct a current equal to the current mirrored to devices M3 and M3A, the voltage of the drain of device M3A will increase, raising the gate voltage of device M5 to sufficiently turn on the same to shunt through devices M6 and M5, the part of the current from the charge pump which exceeds the current through the diode connected P-channel devices M8 through MN and devices M3 and M3A. (The headroom provided by the threshold voltage of device M5 is more than adequate for the operation of the mirror devices M3 and M3A.) This prevents the charge pump from charging the VPUMP line to a voltage above the intended regulated voltage.

Having now described the details of the various circuits, an overview of their cooperative operation will now be provided. The bias current generated by the bias generator of FIG. 1a is approximately equal to VT/R1, which is independent of variations in the power supply voltage VCC. This bias current (or a current proportional thereto) is used as the charging and discharging current in the ring oscillator of FIG. 1b. The oscillator period is proportional to Cload*V/Ibias, where V is the trip voltage of the inverter, which is about VCC/2. Hence Tosc≈K*Cload*VCC/VT*R1, where K is a constant. Hence, as VCC reduces (power supply variations) or VT increases (process and temperature variations), Tosc decreases (frequency increases). Since, in FIG. 1c, the charge on capacitor CP1 after the periodic charging thereof decreases with a decrease in VCC, and/or an increase in VT, and the transfer of charge from one capacitor to the next decreases as VCC decreases and/or VT increases, the charge pumped in each cycle of operation of the voltage multiplier decreases with decreases in VCC or increases in VT. However the corresponding increase in the oscillator frequency provides an offsetting increase in charge pump cycle rate, achieving the desired compensation. The only requirements are that under the worst conditions (lowest VCC and highest VT), the open circuit (no load) voltage the charge pump will pump to is above the intended regulated voltage and that the increase in the oscillator frequency because of the worst conditions is adequate to keep the charge pump output current high enough to maintain the regulated voltage in spite of the normal operating load thereon.

A reference voltage, VREF1, is imposed on the source of device M1. Another reference voltage, VREF2, is imposed on the gate of device M1. These reference voltages could be generated from a reference circuit such as a standard CMOS bandgap. The value of VREF2 is chosen to be close to the gate source voltage of device M2 to make VGD (the gate-drain voltage) of device M1 close to zero to match VGD=0 V of the diode connected PMOS transistors M8 and MN. The values of VREF1 and VREF2 are chosen to make the bias current generated by device M1 small, resulting in insignificant loading on the high voltage source VPUMP, e.g. the charge pump output. The gate-source voltage (VREF1−VREF2) of device M1 creates a bias current in devices M2 and M2A which is mirrored to devices M3 and M3A and through the chain of diode connected devices M8 through MN. Since exactly the same current flows in each of the diode connected PMOS transistors M8 through MN, and each, as well as device M1, has its body connected to its source, the gate-source voltages of these diode connected PMOS transistors must be the same as that of device M1. Hence a stable voltage reference for the voltage VPUMP is realized.

The precise current mirror is accomplished from device M1 to the diode connected device chain by using cascode connections with native NMOS devices (VT=0 V) for devices MN2A and MN3A. The cascade current mirror with the native MOS devices requires minimum headroom voltage (1 gate-source voltage instead of 2 gate-source voltages as in normal NMOS cascade current mirrors) and minimum circuitry. The other cascading schemes with minimum headroom voltage typically require other control circuits. For example, for two enhancement NMOS devices in series, the top NMOS device gets it gate bias from another bias circuit, the bottom NMOS device has its gate tied to the drain of the top NMOS and its source tied to ground.

The mirrored PMOS transistors have their own substrates tied to their own sources to eliminate the body effect in order to achieve the precise gate-source voltage mirroring. The variation of the bias current does not matter, since precisely the same current is flowing through the reference PMOS and the diode PMOS transistors, and it is the voltage difference VREF1–VREF2 and the number of times it is replicated in the diode chain that determines the regulated voltage VPUMP.

The number of diode PMOS transistors may be varied to achieve different regulated output voltages. The VREF1 and/or VREF2 could also be varied to achieve different regulated output voltages, subject to reasonable minimum and maximum current limitations. Also, since across any diode connected PMOS device, the drain to gate voltage is precisely at the reference differential voltage, and the P+ drain to n-well is also at the gate-source voltage reference, no breakdown mechanism is violated.

The shunting NMOS device M6 utilizes a medium voltage level, about 11 V, to avoid the gated diode effect of a low voltage NMOS device, since now device M6 sees a maximum gate to drain voltage of VHV–MHV, about 10 v, much less than the gated diode breakdown specification of a low voltage NMOS device which is normally higher than 13 v. Device M5 also sees a maximum of gate to drain voltage of MHV–VT of M6≅10 v.

The regulated output is exactly equal to N*(VREF1–VREF2)+VT of device M4, where N is number of diode connected PMOS transistors. For example, N=10, VREF1= 2.5, VREF2=0.5, VHV=10*2+0.8=20.8 V. A precise regulation is thus achieved since the threshold VT variation of device M4 due to temperature and process variations is insignificant. For example, 0.2 V for a 20 V output, which is about 1%.

The foregoing is in contrast with the prior art which uses a number N of MOS devices as diode connected devices for regulation. The regulated output is approximately equal to (N+1)*VT of the MOS devices. In this case, as the temperature or process varies, VT varies directly, which causes the regulated voltage to change by an (N+1) factor. Also along the chain of diode connected MOS transistors, the body effect is different, causing the gate-source voltages of the diode connected MOS transistors to be different, which in turn causes the final voltage to be inexact and variable.

In other implementations, the MOS diode connected devices M8 to MN could be replaced by zener diodes to realize the precise control voltage for the shunting NMOS devices. In such a case the bias current for the zener diodes should be stable enough for the zener voltage not to change too much. However zener diodes are not readily fabricated using standard CMOS process technology.

While preferred embodiments of the present invention have been disclosed and described herein, it will be obvious to those skilled in the art that various changes in form and detail may be made therein without departing from the spirit and scope of the invention.

I claim:

1. A shunt regulator comprising; a plurality of diode connected transistors connected in series, the series of diode connected transistors having a first end thereof for coupling to a high voltage source and a second end;

a current source;

a current mirror coupled to the second end of the plurality of diode connected transistors to mirror a current of the current source to the plurality of diode connected transistors; and a shunt transistor coupled to the current mirror to shunt current from the high voltage source to a circuit ground.

2. The shunt regulator of claim 1, wherein said high voltage source is generated by a voltage multiplier circuit.

3. The shunt regulator of claim 2, further comprising a MOS charge pump system coupled to said voltage multiplier circuit.

4. The shunt regulator of claim 22 wherein said MOS charge pump system comprises:

a charge pump;

a bias generator for generating a bias responsive to the threshold voltage of a MOS device; and a charge pump oscillator coupled to the bias generator and the charge pump, the charge pump oscillator being responsive to the bias and to a power supply voltage to drive the charge pump at a frequency responsive to the threshold voltage of a MOS device and to the power supply voltage, the frequency increasing with an increase in the threshold voltage, and the frequency increasing with a decrease in the power supply voltage.

5. The shunt regulator of claim 1 wherein the bias comprises bias currents.

6. The shunt regulator of claim 5 wherein the bias currents comprise currents approximately proportional to the threshold voltage of a MOS device.

7. The shunt regulator of claim 6 wherein the bias currents determine the charge and discharge rates of a capacitor in the charge pump oscillator determining the frequency of oscillation thereof.

8. The shunt regulator of claim 1 wherein the transistors are MOS transistors, each having a source, a gate, and a drain.

9. The shunt regulator of claim 8 wherein the diode connected transistors each have their own substrate, each diode connected transistor having its source connected to its substrate.

10. The shunt regulator of claim 8 wherein the shunt transistor is for coupling to the high voltage source through a buffer MOS transistor having a source, a gate and a drain, the gate of the buffer transistor for coupling to a voltage source between the high voltage source and the circuit ground.

11. The shunt regulator of claim 8 wherein the current mirror comprises first pair and a second pair of mirror transistors, each having a gate, a source and a drain, the sources of the first pair of mirror transistors being coupled to the circuit ground, the drains of the first pair of mirror transistors being coupled to the sources of the second pair of mirror transistors, the drain of a first mirror transistor of the second pair of mirror transistors being coupled to the current source, the drain of a second mirror transistor of the second pair of mirror transistors being coupled to the second end of the series of diode connected transistors.

12. The shunt regulator of claim 11 wherein the second pair of mirror transistors are native transistors.

13. The shunt regulator of claim 8 wherein the high voltage source is a positive high voltage source, the diode connected transistors are p-channel transistors and the rest of the transistors are n-channel transistors.

14. The shunt regulator of claim 8 further comprising a first additional transistor coupled between the plurality of diode connected transistors and the current mirror and responsive to an enable signal to turn on when the enable signal is active and to turn off when the enable signal is inactive, and a second additional transistor coupled between the gate of the shunt transistor and the circuit ground to turn on when the enable signal is inactive and to turn off when the enable signal is active.

15. The shunt regulator of claim 8 wherein the high voltage source is a charge pump.

16. A method of voltage regulation comprising the steps of:
 (a) providing a regulated voltage differential between the gate and source of a first MOS transistor to obtain a first current there through;
 (b) mirroring the first current to a plurality of diode connected transistors connected to a charge pump; and
 (c) shunting current from the charge pump to maintain the current through the plurality of diode connected transistors equal to the current mirrored thereto.

17. The method of voltage regulation of claim 16 wherein the transistors are MOS transistors, each having a source, a gate, and a drain.

18. The method of shunt regulation of claim 17 wherein the diode connected transistors each have their own substrate, and further comprising the step of connecting the substrate of each transistor to its source.

19. The shunt regulation of claim 18 wherein in step (c), current is shunted from the charge pump through a buffer MOS transistor, and the gate of the buffer transistor is coupled to a voltage source between the high voltage source and a circuit ground.

20. The shunt regulation of claim 17 wherein in step (b), the first current is mirrored to the plurality of diode connected transistors through a cascode current mirror.

21. The shunt regulation of claim 17 wherein in step (b), the first current is mirrored to the plurality of diode connected transistors through a cascode current mirror using native transistors.

22. The method of voltage regulation of claim 16, further comprising the step of providing an elevated voltage from a power supply having a power supply voltage VCC and a power supply ground.

23. The method of voltage regulation of claim 23, wherein said step of providing an elevated voltage from a power supply having a power supply voltage VCC and a power supply ground comprises the steps of:
 (a) providing a MOS device charge pump operating between VCC and ground to provide the elevated voltage output;
 (b) providing a MOS device charge pump oscillator driving the charge pump; and
 (c) operating the charge pump oscillator at a frequency which increases with an increase in the threshold of the MOS devices and which increases with a decrease in VCC.

* * * * *

UNITED STATES PATENT AND TRADEMARK OFFICE
CERTIFICATE OF CORRECTION

PATENT NO. : 5,808,506
DATED : September 15, 1998
INVENTOR(S) : Tran

Page 1 of 1

It is certified that error appears in the above-identified patent and that said Letters Patent is hereby corrected as shown below:

Column 7,
Line 11, delete "The cascade" and insert -- The cascode --.
Line 14, delete "NMOS cascade" and insert -- NMOS cascode --.
Line 15, delete "cascading schemes" and insert -- cascoding schemes --.
Line 29, delete VPUMP." and insert -- . --.

Column 8,
Line 28, delete "of claim 22" and insert -- of claim 3 --.
Line 41, delete "of claim 1" and insert -- of claim 4 --.
Line 64, delete "comprises first pair" and insert -- comprises a first pair --.

Column 10,
Line 21, delete "of claim 23" and insert -- of claim 22 --.

Signed and Sealed this

Twenty-first Day of August, 2001

Attest:

*Nicholas P. Godici*

NICHOLAS P. GODICI
*Attesting Officer*    *Acting Director of the United States Patent and Trademark Office*